United States Patent [19]

Pietsch et al.

[11] 4,105,457

[45] Aug. 8, 1978

[54] BRIQUET AND METHOD OF MAKING SAME

[75] Inventors: Wolfgang B. Pietsch, Matthews, N.C.; Charles A. Schroer, De Bordieux Colony, S.C.

[73] Assignee: Midrex Corporation, Charlotte, N.C.

[21] Appl. No.: 808,929

[22] Filed: Jun. 22, 1977

Related U.S. Application Data

[63] Continuation-in-part of Ser. No. 682,418, May 3, 1976, Pat. No. 4,032,352.

[51] Int. Cl.² ............................................. C04B 35/16
[52] U.S. Cl. ....................... 106/78; 106/84; 75/256
[58] Field of Search .............. 106/78, 84; 75/3, 44 R, 75/44 S, 256

[56] References Cited

U.S. PATENT DOCUMENTS

| 2,883,723 | 4/1959 | Moore et al. | 106/78 |
| 3,837,872 | 9/1974 | Conner | 106/78 |
| 3,849,356 | 11/1974 | Matsui et al. | 106/78 |

*Primary Examiner*—James Poer
*Attorney, Agent, or Firm*—Ralph H. Dougherty

[57] ABSTRACT

A briquet consisting of agglomerated directly reduced metallized particles, or mineral ore particles or a mixture thereof and a binder consisting of hydrated lime, sodium silicate and water. The method of making the briquet is also disclosed.

6 Claims, No Drawings

BRIQUET AND METHOD OF MAKING SAME

CROSS-REFERENCE TO RELATED APPLICATION

This is a continuation-in-part application of Wolfgang B. Pietsch application Ser. No. 682,418, filed May 3, 1976, now U.S. Pat. No. 4,032,352.

BACKGROUND OF THE INVENTION

This invention relates to the field of agglomeration of mineral ores and more particularly to agglomeration of directly reduced metallized particles or oxide fines. An extremely large number of binder compositions have been developed and patented over the years. However, no binder is known to be suitable for agglomerating highly metallized finely divided particulates such as iron fines from a direct reduction process, a steel mill, a foundry or the like, either with or without metal oxide fines produced in similar plants or from ore treatment processes in the iron and steel industry, without oxidizing the metallic fines. A significant percentage of finely divided iron particulates or fines are produced in the operation of a direct reduction furnace whereby iron ore or pellets are reduced to highly metallized particles, such as pellets or lumps, by direct contact with a reducing gas, such as a mixture of hydrogen and carbon monoxide. These fines are normally discarded or stockpiled and constitute a waste material since heretofore there has been no suitable binder available for agglomerating these fines. Sintering or other treating method normally causes oxidation of the fines which thereupon require an additional reduction step. This is, of course, extremely inefficient inasmuch as the particulates are reduced twice.

Another method for utilizing fines that has been tried is to seal the fines into drums and charge the drums filled with fines into a steelmaking furnace. This is an extremely expensive method of recovering the fines because of high handling costs and drum expense. In addition, the finely divided particles constitute a health hazard for workers as well as a dust problem in the furnace.

Briquets have been found to be a very desirable charge material in iron or steelmaking. They are particularly suitable for foundries. The high specific gravity enables briquets to penetrate the slag layer on a molten metal bath in an induction furnace more readily than other, lighter charge materials. The large size of briquets prevents them from trickling through a furnace charge as is common with fine materials, particularly when employed as a charge material for cupolas. The quality of the present binder allows the addition of coke breeze, ferro-alloys and other materials to the briquets, which can be stored and handled in the same manner as steel scrap. The high strength of the briquets, and the rust inhibiting properties of the binder allow outdoor storage and generally rough handling. The binder composition also makes it possible to tailor-make briquets for particular applications.

OBJECTS OF THE INVENTION

It is the principal object of this invention to provide a relatively inexpensive binder composition for agglomerating fine particulate metallic ores without loss of metallization.

It is another object of this invention to provide a binder composition which imparts high green strength to briquets.

It is also an object of this invention to provide a binder composition which increases the high strength of briquets upon curing.

It is also an object of this invention to provide a binder composition for agglomerating metallized material, metal ores, metal oxide fines, and mixtures thereof.

It is another object of this invention to provide a binder composition which results in briquets which are themselves strong, easily handled with standard loading and unloading equipment and produce a minimum of dust during handling.

It is another object of this invention to provide a binder composition which is required in minimum amounts for the production of briquets.

It is another object of this invention to provide a binder composition, the components of which are readily available in many countries throughout the world.

It is also an object of this invention to provide a binder composition which will protect a briquet from significant loss of metallization by inhibiting reoxidation or rusting.

It is also an object of this invention to provide a binder composition for producing high quality briquets over a wide range of component variations.

It is also an object of this invention to provide a binder composition highly insensitive to amount of moisture in the feed material.

It is another object of the invention to provide a binder composition for agglomerating particulates, the particle size of which is not absolutely critical.

It is another object to provide a high quality briquet having high green strength, high cured strength and which is rust resistant.

It is another object to provide a method for the total recovery of fines from a direct reduction plant whereby wet fines, dry fines, and undersized product from a direct reduction furnace are all briquetted or otherwise agglomerated using a common binder.

SUMMARY OF THE INVENTION

The present invention is a briquet consisting of agglomerated particles of iron ore, iron oxide, metallized iron particles or a mixture thereof and a binder consisting of hydrated lime, sodium silicate and water. U.S. Pat. No. 2,205,043 teaches a binder of water glass i.e. sodium silicate, and limestone or dolomite. We have determined that the invented binder is markedly superior to that of the referenced patent as is explained in greater detail below.

DETAILED DESCRIPTION

The binder of the present invention consists essentially of liquid sodium silicate, hydrated lime, and water. This binder has exceptional characteristics including high green strength and rust inhibiting capability.

The binder material is mixed with finely divided metallized material such as directly reduced sponge iron fines to form a free flowing feed material. The feed material is mixed and predensified by apparatus such as a mix muller, then formed into briquets or other dense compact product by known formation means. Suitable briquetting machines are taught by U.S. Pat. No. 3,897,183 and numerous other patents.

The broad range of the binder composition is from 15 to about 40 percent hydrated lime, from about 15 to about 45 percent liquid sodium silicate and up to 60 percent water. The preferred range is 15 to 30 percent hydrated lime, 30 to 45 percent liquid sodium silicate and remainder water. Another suitable range which is very economical is from about 30 to about 40 percent hydrated lime, from about 15 to about 25 percent liquid sodium silicate and up to 55 percent water.

The liquid sodium silicate is in aqueous solution, having a concentration of 30 to 55 percent by weight, depending on the type of sodium silicate. Sodium silicate is a generic term for a family of chemicals composed of sodium oxide ($Na_2O$), silica ($SiO_2$) and usually water ($H_2O$). The proportion of $Na_2O$ to $SiO_2$ in sodium silicates is expressed as a weight ratio with the alkali component held at unity. Commercial grades of liquid sodium silicate are usually concentrated for convenient handling. For instance, sodium silicate having a weight ratio of 3.22 can readily be handled up to a solids content of about 39.8 percent which is equivalent to approximately 43° Baume.

A liquid sodium silicate solution as employed in the invention has a weight ratio of 3.22, a solids content of 37.6 percent, a density of 41.0° Baume, and a viscosity of 180 centipoise. Liquid sodium silicate as used throughout this specification refers to this 37.6 percent solids sodium silicate solution unless otherwise specified.

Other sodium silicates can be utilized but it is preferable to maintain the $Na_2O$ at the lowest possible ratio to $SiO_2$. Thus the 3.22 mixture, which is also the most readily available commercially, is the preferred ratio.

The sodium silicate solution brings to the binder composition the property of rendering the subsequent agglomerates or briquets rust resistant.

The hydrated lime of the binder composition is preferably in powdered form, and most preferably all minus 100 mesh. The hydrated lime produces plasticity of the mixture to be briquetted and improves briquet strength.

The dry component of the invented binder composition is metered into the briquet feed material together with the liquid binder component when the feed material is mixed before briquetting.

Three binder compositions were compared for effectiveness in bonding briquets: Composition A in accordance with U.S. Pat. No. 2,205,043; Composition B in accordance with U.S. patent application Ser. No. 682,418; and Composition C in accordance with the present invention. These binder formulations are as shown in Table 1.

TABLE I

| Component | Composition A | Composition B | Composition C |
|---|---|---|---|
| Sodium Silicate | 21.2% | 21.2% | 21.2% |
| Hydrated Lime | 0 | 18.2% | 36.4% |
| Powdered Pitch | 0 | 18.2% | 0 |
| Limestone | 36.4% | 0 | 0 |
| Water | 42.4% | 42.4% | 42.4% |

All of the briquets were produced using the following conditions:
Mulling time — 2 minutes;
Briquet machine setting hydraulic pressure — 1600 psi;
Accumulator pressure — 900 psi.

The material leaving the briquetting rolls was screened on a one-half inch screen to determine the briquetting efficiency. The briquets were evaluated by drop tests of freshly produced briquets and of "aged" briquets about 24 hours after the time of production. Each sample consisted of 2 kilograms of briquets which were dropped 12 feet onto a steel plate. Two batches of each type were tested and the results were averaged. The tests were repeated for Composition B.

The results of the comparison tests are shown in Table II below:

TABLE II

| Binder Composition | A | | B | | B (Repeated) | | C | |
|---|---|---|---|---|---|---|---|---|
| briquetting efficiency (%—½") | 21.4% | | 20.9% | | 22.3% | | 18.0% | |
| | 1 drop | 5 drops | 1 drop | 5 drops | 1 drop | 5 drops | 1 drop | 5 drops |
| Fresh Briquets | | | | | | | | |
| %+½" | 68.8 | 18.2 | 62.4 | 16.8 | 73.4 | 20.3 | 84.1 | 36.1 |
| %+3M | 74.5 | 25.6 | 70.9 | 26.0 | 79.0 | 30.0 | 86.8 | 46.6 |
| %+6M | 79.0 | 31.8 | 76.1 | 33.6 | 83.4 | 38.9 | 89.9 | 54.9 |
| %−6M | 21.0 | 68.2 | 23.9 | 66.4 | 16.6 | 61.1 | 10.1 | 45.1 |
| Briquets Aged 24 hours | 1 drop | 5 drops | 1 drop | 5 drops | 1 drop | 5 drops | 1 drop | 5 drops |
| %+½" | 76.1 | 24.7 | 84.5 | 31.5 | 87.9 | 38.1 | 93.2 | 60.4 |
| %+3M | 80.9 | 30.5 | 87.5 | 41.3 | 90.9 | 49.4 | 94.7 | 67.2 |
| %+6M | 83.8 | 36.1 | 90.4 | 50.2 | 92.9 | 57.8 | 96.0 | 73.2 |
| %−6M | 16.2 | 63.9 | 9.6 | 49.8 | 7.1 | 42.2 | 4.0 | 26.8 |

Briquets made with the binder Composition C in accordance with the present invention clearly show test results superior to the binders of the prior art references. Note that the briquetting efficiency is greater as well as the green strength and aged strength of the briquets. In addition, briquets made with the invented binder are passivated against fresh water. Briquets wetted with fresh water and placed into an insulated vented 55 gallon drum for four days showed no heating during and no rusting at the end of the test. Further, briquets soaked in fresh water for three days did not rust during succeeding air drying.

From the foregoing, it is readily apparent that the invented binder composition produces a briquet which has high green strength, high cured strength, high overall quality, and is insensitive to moisture.

What is claimed is:

1. A metallized iron briquet consisting essentially of from about 85 percent to about 95 percent directly reduced metallized iron and from about 5 percent to about 15 percent of a binder comprising:
   (a) from about 15 to about 40 percent hydrated lime,
   (b) from about 15 to about 45 percent liquid sodium silicate, and
   (c) up to 60 percent water.

2. A briquet consisting essentially of from about 85 to about 95 percent of particulate material from the group consisting of directly reduced finely divided metallized material, metallized oxide fines, finely divided metal ores, and mixtures thereof and from about 5 to about 15 percent of a binder comprising:
(a) from about 15 to about 40 percent hydrated lime,
(b) from about 15 to about 45 percent liquid sodium silicate, and
(c) up to 60 percent water.

3. A briquet according to claim 2 wherein said metal is iron.

4. A method of making a briquet from particulate material from the group consisting of directly reduced finely divided metallized material, metal oxide fines, finely divided metal ores, and mixtures thereof, comprising:
(a) mixing from 85 to 95 percent of particulate material with from about 5 to about 15 percent of a binder comprising:
(1) about 15 to about 40 percent hydrated lime in powdered form,
(2) about 15 to about 45 percent aqueous solution of liquid sodium silicate, and
(3) up to 60 percent water to form a free flowing yet dense briquet feed material;
(b) densifying said feed material; and
(c) forming said feed material into briquets.

5. A method according to claim 4 wherein said metal is iron.

6. A method according to claim 4 wherein the particle size of said hydrated lime is all minus 100 mesh.

* * * * *